United States Patent
Delbrück et al.

(10) Patent No.: US 6,603,082 B1
(45) Date of Patent: Aug. 5, 2003

(54) DEVICE FOR CONTROLLING A PHYSICAL SYSTEM

(75) Inventors: Tobias Delbrück, Zürich (CH); Rodney James Douglas, Zürich (CH); Pierre Marchal, Valangin (CH); Paul Verschure, Zürich (CH); Adrian Maurice Whatley, Zürich (CH)

(73) Assignees: Eidgenossische Technische Hochschule Zurich, Zurich (CH); Universitat Zurich, Zurich (CH)

( * ) Notice: Subject to any disclaimer, the term of this patent is extended or adjusted under 35 U.S.C. 154(b) by 0 days.

(21) Appl. No.: 09/685,240

(22) Filed: Oct. 10, 2000

(30) Foreign Application Priority Data

Oct. 8, 1999 (EP) .............................. 99120136

(51) Int. Cl.[7] ........................ G01G 19/52; G08G 1/095; G08B 23/00
(52) U.S. Cl. ...................... 177/132; 177/133; 177/142; 177/25.13; 177/199; 177/177; 340/944; 340/666; 340/541; 340/573.1
(58) Field of Search ................................ 177/132, 133, 177/134, 135, 142, 143, 144, 199, 200, 45, 177, 238, 240, 244, 245, 126, 145, 25.11, 25.12, 25.13; 340/944, 666, 331, 332, 958, 691.1, 691.3, 541, 573.1, 531

(56) References Cited

U.S. PATENT DOCUMENTS

| | | | | |
|---|---|---|---|---|
| 2,713,645 A | | 7/1955 | Lerch ........................ 307/119 |
| 3,187,826 A | * | 6/1965 | Traff .......................... 177/126 |
| 4,398,184 A | * | 8/1983 | Scott et al. .................. 340/531 |
| 4,737,764 A | * | 4/1988 | Harrison ..................... 340/331 |
| 4,888,581 A | * | 12/1989 | Guscott ....................... 340/666 |
| 4,969,112 A | * | 11/1990 | Castle ....................... 177/25.13 |
| 4,992,775 A | * | 2/1991 | Castle et al. ................ 340/666 |
| 5,004,058 A | * | 4/1991 | Langford et al. ......... 177/25.13 |
| 5,167,289 A | * | 12/1992 | Stevenson ................. 177/25.13 |
| 5,210,528 A | * | 5/1993 | Schuluman et al. ........ 340/666 |
| 5,446,265 A | * | 8/1995 | McAllister ............. 340/825.06 |
| 5,556,246 A | | 9/1996 | Broshi ........................ 414/278 |
| 5,592,152 A | * | 1/1997 | Huang ......................... 340/666 |
| 5,745,865 A | | 4/1998 | Rostoker ..................... 701/117 |
| 5,750,937 A | | 5/1998 | Johnson ................... 177/25.11 |
| 5,772,153 A | * | 6/1998 | Abaunza et al. ......... 73/861.04 |
| 5,814,771 A | * | 9/1998 | Oakes et al. ................ 177/136 |
| 5,959,259 A | | 9/1999 | Beshears ..................... 177/132 |
| 6,242,701 B1 | * | 6/2001 | Breed et al. ................. 177/144 |
| 6,323,773 B1 | * | 11/2001 | Runyon et al. ........... 340/573.1 |
| 6,346,680 B1 | * | 2/2002 | Takahashi et al. .......... 177/199 |
| 6,384,742 B1 | * | 5/2002 | Harrison ..................... 340/944 |
| 6,486,784 B1 | * | 11/2002 | Beckers ...................... 340/944 |

FOREIGN PATENT DOCUMENTS

| | | | | |
|---|---|---|---|---|
| EP | 539275 A1 | * | 4/1993 | ................. 340/666 |
| GB | 2064222 | * | 6/1981 | ................. 340/666 |
| WO | WO 95/04291 | * | 2/1995 | ................. 340/666 |
| WO | WO9702474 | | 1/1997 | .......... G01G/19/14 |

OTHER PUBLICATIONS

Andrew S. Tanenbaum, Computer Networks, Third Edition, Prentice–Hall International, Inc., table of contents and pp. 2, 8 and 28–31. © 1996.

* cited by examiner

Primary Examiner—Randy Gibson
(74) Attorney, Agent, or Firm—Cooper & Dunham LLP; Donald S. Dowden

(57) ABSTRACT

A device for controlling a physical system, such as a flow of pedestrians, in an extended area is suggested. In comprises a plurality of identical cell units with preferably hexagonal shape. The cell units are assembled in tile-like manner to form a floor. Each cell unit is equipped with a weight sensor, lamps of different colors, and optical communication ports as well as power connectors for connecting it to its neighboring cells. The cell units can be programmed to generate signals that control the physical system, such as signs understood by the pedestrians. Due to its modularity and simple design, the device is easy to install and maintain.

6 Claims, 3 Drawing Sheets

DEVICE FOR CONTROLLING A PHYSICAL SYSTEM

CROSS REFERENCE TO RELATED APPLICATIONS

This application claims the priority of European application 99120136.9, filed Oct. 8, 1999, the disclosure of which is incorporated herein by reference in its entirety.

BACKGROUND OF THE INVENTION

The present invention relates to a device for controlling a physical system as to applications of such a device.

By "physical system", we understand any system that can vary its state in time and the state of which is expressed by physical parameters, wherein the state of the system can be influenced by physical control signals. Examples for such systems are e.g. the traffic of vehicles and/or pedestrians, objects in a storage or in a distribution system, etc.

For controlling such systems, complex devices are required, such as traffic controls, warehouse management systems, etc. Due to their complexity, the design, installation and maintenance of such devices are complicated and costly.

BRIEF SUMMARY OF THE INVENTION

Hence, it is a general object of the invention to provide a device of this type that is simpler to design, install and maintain.

Now, in order to implement these and still further objects of the invention, which will become more readily apparent as the description proceeds, the device for controlling a physical system in an extended area is based on detecting parameters of said system and generating control signals for influencing said system and it comprises a plurality of substantially identical cell units arranged periodically over said area, wherein each cell comprises at least one detector for detecting at least one of said parameters, an output for generating at least one of said control signals, communication ports connected to neighboring cell units in said area, and a control controlling said output as a function of the at least one parameter detected by said detector and of information received through said communication ports.

In another aspect, the invention relates to a device for controlling a traffic flow, preferably a traffic flow of pedestrians, in an extended area and is based on detecting parameters of said traffic flow and generating control signals for influencing said traffic flow. It comprises a plurality of substantially identical cell units arranged periodically over said area, wherein each cell comprises at least one detector for detecting at least one of said parameters, an output for generating at least one of said control signals, communication ports connected to neighboring cell units in said area, and a control controlling said output as a function of the at least one parameter detected by said detector and of information received through said communication ports.

By using a plurality of identical cell units arranged periodically over the area to be controlled, the design, installation and maintenance of the device are simplified.

Preferably, the cell units form a regular, two dimensional pattern. Like tiles, they can be joined to form a substantially continuous floor of arbitrary shape, which again simplifies the design and installation of the device.

In a preferred embodiment, the cell units are substantially hexagonal and form a hexagonal pattern. It has been found that a hexagonal system provides better spatial resolution than e.g. an orthogonal one. Preferably, each cell unit comprises communication ports for communicating with each of its six neighbors, which results in a powerful communication pattern where each cell can send messages into six directions.

Besides hexagonal cell units, units of any other tessellatable shape are advantageous, or at least units having communication ports for communicating with as many neighbors as they have sides.

Communication between the cell units can be wireless, preferably by optical links. This obviates the need for providing physical connectors and therefore simplifies installation and increases reliability.

Preferably, each cell unit has power connectors connected to at least two, preferably all, neighboring cells, thereby forming a redundant power grid feeding all said cell units. Power supply to all cell units can be established by simply adjoining the cell units and linking their power connectors.

For starting up the system or individual cell units, each cell unit is provided with a bootstrapper, which load the parameters for controlling the behavior of the cells from its neighbors. These parameters can e.g. be numerical values, a program for a microprocessor, or a connection pattern for a programmable gate array.

Examples of physical systems that can be controlled by the present device are:

Moving objects (such as pedestrians or vehicles) in a given area, wherein the control signals are signs, lights, sounds etc. that can be perceived by the objects. Applications are e.g. traffic control systems for vehicles or pedestrians or a game arena where the players act according to rules determined by the signs, lights etc.

A flow pattern of a fluid, wherein the control signals are adjustable vanes guiding the flow.

Objects to be conveyed, wherein the control signals are actuators (such as conveyor units) moving the objects in various directions. Applications are e.g. automatic storage or distribution systems.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

The mechanical design of a preferred embodiment of the present invention is shown FIGS. 1–4. It comprises a plurality of hexagonal cell units 1, which are adjoined in a regular, repetitive hexagonal pattern to form a floor 2.

Figure 1:
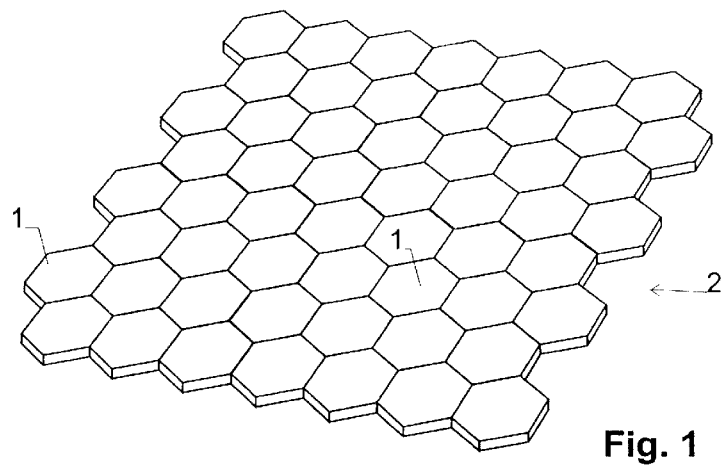
FIG. 1 a floor consisting of hexagonal cell units.
Figure 2:
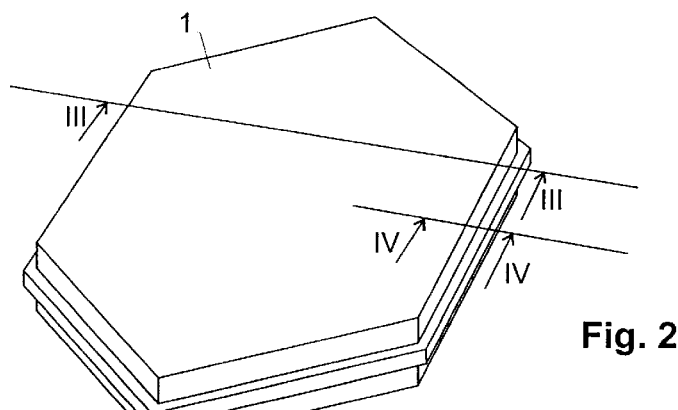
FIG. 2 an individual cell unit of the floor of FIG. 1.
Figure 3:
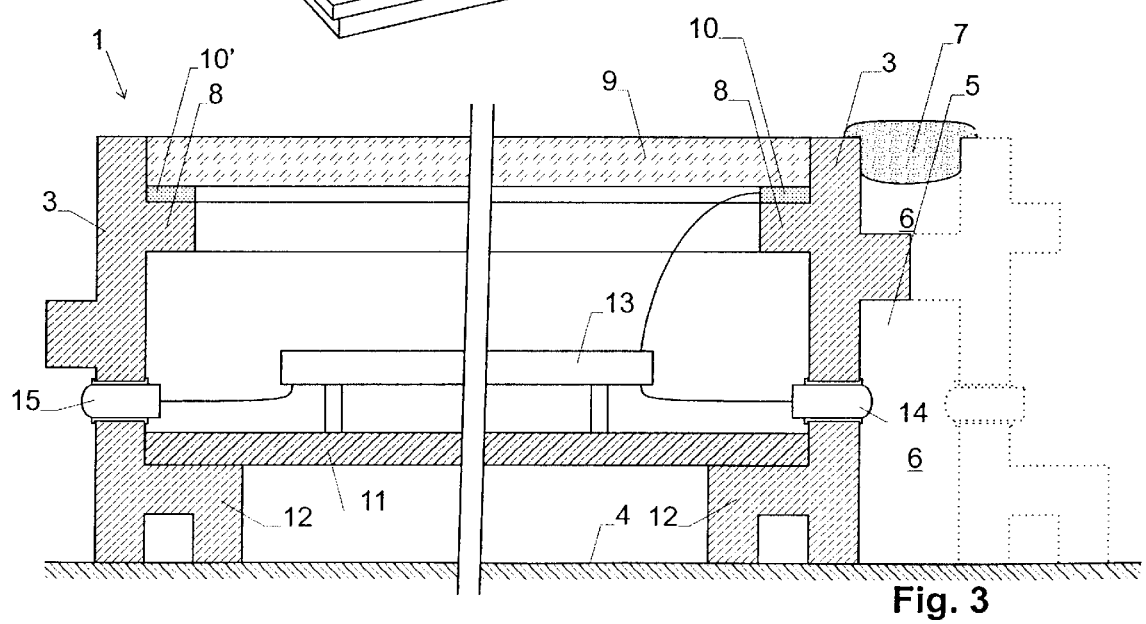
FIG. 3 a section through the cell unit along line III—III of FIG. 2.

As best can be seen from FIG. 3, each cell unit 1 comprises a frame, consisting of six aluminum profiles 3, resting on a base 4. The profiles comprise an outer projection 5 abutting on the corresponding outer projection of the profiles of neighboring cell units and defining gaps 6 between the cell units. Sealant 7 is used for closing the gaps 6 from above. Furthermore, profile 3 comprises inner projections 8 for carrying a translucent cover plate 9. Three weight sensors 10 are arranged between the inner projections 8 and cover plate 9 for measuring the weight resting of cover plate 9. Three dummy weight sensors or spacers 10' are arranged on the sides opposite to the weight sensors for supporting cover plate 9. The bottom of the cell units 1 is closed by a bottom plate 11 resting on a foot section 12 of the profiles 3.

Control circuitry 13 is arranged within each cell unit 1, the operation of which will be explained below. This circuitry is connected to optical transmitters and receivers 14, 15 arranged in frame 3 and providing a contactless, optical communication ports with neighboring cell units. One emitter 14 and one receiver 15 are arranged on each side of the unit cell, thus establishing means for two way communication with each neighboring cell unit.

Figure 4:
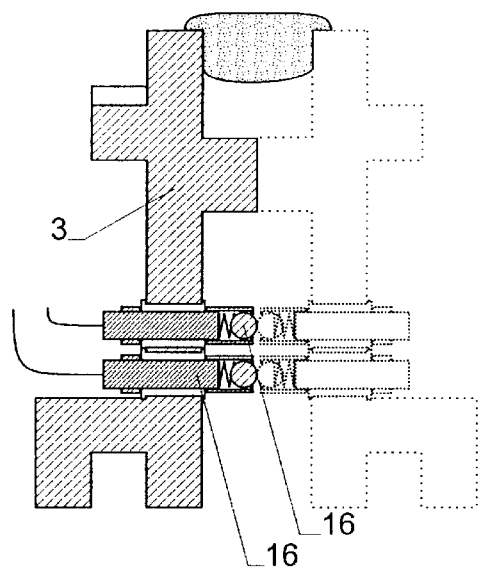
FIG. 4 a section along line IV—IV of FIG. 2.

Furthermore, as shown in FIG. 4 two spring biased ball contacts 16 are arranged on each side of the cell unit. They provide an electrical two pole contact with each neighboring cell unit for a power supply system.

Figure 5:
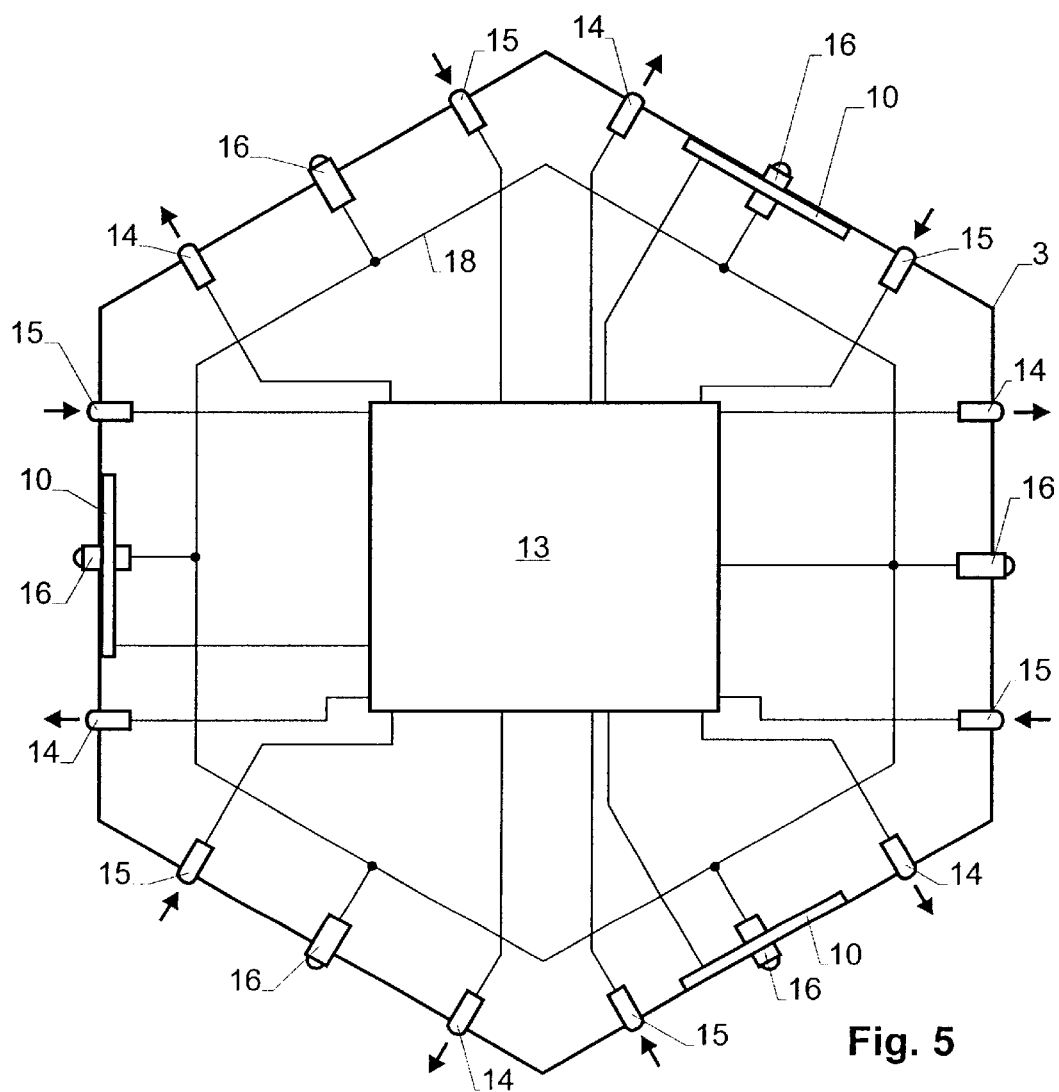
FIG. 5 a schematic wiring diagram of a cell unit.

The arrangement of the weight sensors 10, the transmitters 14 and receivers 15 as well as the contacts 16 can best be seen in FIG. 5.

The weight sensors 10 are mounted on three sides of the cell unit for providing a stable support for cover plate 9.

The transmitters 14 and the receivers 15 are alternatingly arranged around the cell unit, such that each emitter 14 aligns with a receiver 15 of a neighboring cell unit.

The two pole contacts 16 are arranged in the center of each side for contacting the corresponding contacts of the next neighboring cell. They are connected to a common internal two pole power bus 18. Power bus 18 feeds control circuitry 13 and forms part of a hexagonal power network, which is connected, to a power supply external to floor 2. This guarantees that each cell unit is safely connected to the power supply as soon as it contacts at least one neighboring cell unit.

They symmetric arrangement of the cell unit allows them to be laid down in any orientation. This, and the absence of connections that must be made by hand, permits floors composed of these cell units to be laid down by personnel with minimal training.

Figure 6:
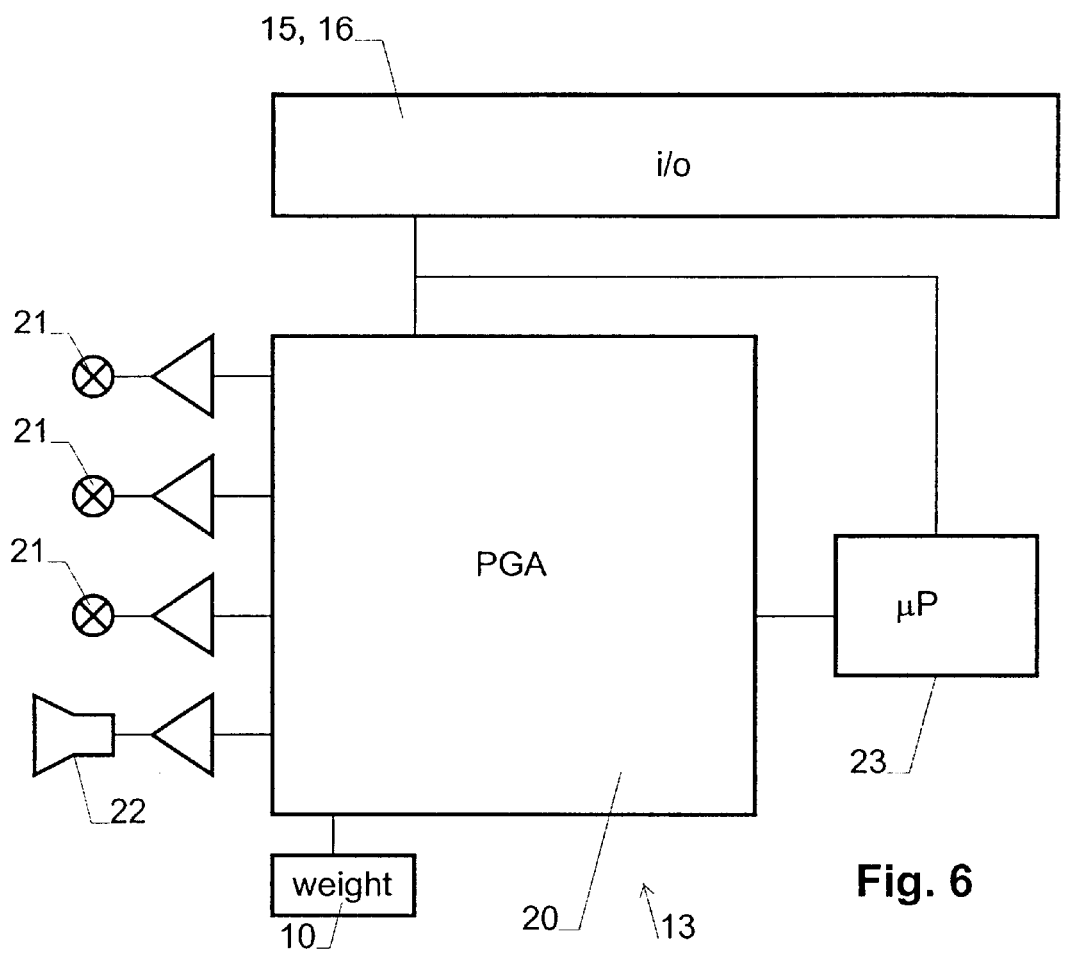
FIG. 6 a block diagram of a cell unit's control electronics.

FIG. 6 shows a block diagram of the control circuitry 13. It comprises an in-circuit programmable gate array (PGA) 20, which is connected to the input/output section formed by the transmitters 14 and receivers 15 as well as to the weight sensors 10. Furthermore, PGA 20 drives a plurality of light sources 21 of different colors, which are embedded within the cell unit and illuminate its translucent cover plate 9 from below, such that their light can be seen from above. PGA 20 further connects to a sound generator and loudspeaker 22. Loudspeaker 22 is arranged below cover plate 9 and is capable of emitting sounds that can be heard from above.

Furthermore, the control circuitry 13 comprises a microprocessor 23, whose configuration is loaded by PGA 20.

The operation of each unit cell is as follows:

Upon powering up, microprocessor 23 takes control and tries to communicate with any neighboring cell units through the transmitters 14 and the receivers 15. As soon as such a connection is established, it queries the neighboring cell units for transmitting configuration data comprising the connection pattern of the gate array and operating software for itself. If the neighboring cell unit is already configured, it transmits this data. The data is loaded into the PGA and the program RAM of the microprocessor 23. In addition to this, the neighboring cell unit transmits coordinate information describing its position and orientation within floor 2, which allows the starting cell unit to derive its own position and orientation and information describing in which direction data should be sent off the floor.

This powering up scheme allows to start up the floor 2 and configuring all cell units 1 within it. Usually, one of its corner cell units is preprogrammed with the configuration data or receives it from an external computer while starting up. Then, this data is automatically propagated over the whole floor.

Once the floor is started up and configured, it is ready to operate according to the instructions given by the connection pattern of the gate array and the microprocessor's program. If necessary, it can be reconfigured at a later time by issuing a reconfiguration command and new configuration data to one cell, which is then propagated through the whole floor.

Data can be exchanged between neighboring cells. For far range communication, messages are relayed from one cell to the next until they reach a destination.

If, during message propagation, an adjacent cell unit is determined to have become non-functional (or if it has been removed or is missing), the message can still be communicated through cell units on either side of the non-functional cell. As a result of this property and the powering-up scheme described above, any cell unit that fails may be removed and replaced without disruption of the floor's functionality.

The behavior of the floor is determined by the configuration data and depends on how the floor is to be used. Examples:

In one embodiment, the floor can be used as a guiding system for pedestrians. For instance, it can be used for evenly distributing a flow of pedestrians through several equivalent passageways. For this purpose, the floor before the passageways is laid out with cell units as described above. Cell units at the entry of each passage way are emitting count signals indicative of the number of pedestrians passing. These signals are linearly propagated from one cell unit to the next.

When a cell unit of the floor detects the presence a pedestrian by means of its weight sensors 10, it tries to provide the pedestrian with a hint on where to go. For this purpose, it checks the incoming count signals and determines the direction of the lowest count signal. It then generates a flash command and emits it to the neighboring cell unit lying in that direction. The receiving cell unit flashes a green light for a predetermined time, and then in its turn emits the flash command to its neighboring cell unit lying in the desired direction, which also flashes its light and propagates the command further. For the pedestrian, this generates a series of light dots starting from his position and going towards the desired direction, thereby telling him/her where to go.

A floor designed in this way can not only expedite the flow of traffic, but it can also be used for collecting statistical data, e.g. for counting the number of pedestrians. In order to collect such data from the individual cell units of the floor, the data can be passed to neighboring cell units until in a series of communications between cell units it reaches the edge of the floor, where edge units relay the data to conventional computer equipment. In addition to or alternatively to this, communication with external computers could also be carried out by means of specialized cells that are not located at the edge.

The floor described so far can also be used for further applications, such as for encouraging the flow of crowds, e.g. in an airport, by marking lanes where people should walk and rest areas where people can stand still, adapting the lanes and rest areas to the current requirements, playing games, such as floor soccer with a virtual ball, or Packman, where a human is the Packman puck and the floor generates gobblers and lane markings, and/or displaying artwork.

By suitably adapting the size and shape of the cell units and their weight sensors, they can also be used for guiding the traffic of vehicles.

In the above embodiments, the cell units are physically identical. It is possible, though, that they differ in their configuration. In particular, individual cell units can be programmed to have individual parameters. To facilitate such a programming, the cell units support a communication protocol that allows an external computer to send messages addressed to individual cells. Such messages are forwarded by the cell units until they reach their destination.

In the embodiment of FIG. 6, lamps 21 are used as output for the cell units. When interacting with human users, red lamps can e.g. be used for marking forbidden areas, green lamps for preferred areas, and yellow lamps for walking directions. In addition to this, loudspeaker 22 can emit warning or encouraging sounds or spoken messages.

When interacting with non-human users, such as robot vehicles, the lamps can e.g. be replaced with short range radio transmitters, induction coils or infrared communication ports.

Figure 7:
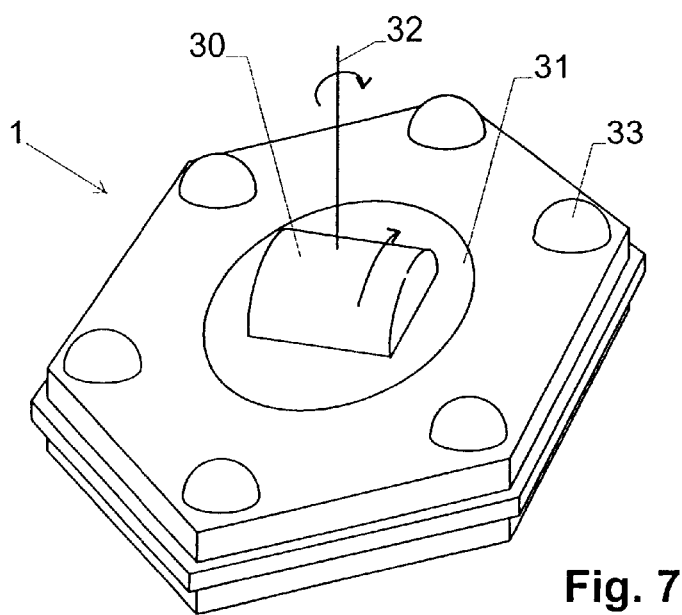
FIG. 7 an alternative embodiment of the invention.

Alternatively or in addition to this, the output can also comprise actuators generating mechanical control signals, such as shown in FIG. 7. Here, a driven, cylindrical roller 30 is arranged at the center of each cell unit 1. It is mounted to a pivotable holder 31, which can be pivoted about a vertical axis 32. Passive ball bearings 33 are arranged at the corners of the cell unit 1.

A floor of cell units 1 as shown in FIG. 7 is able to convey loads lying on top of it in arbitrary directions by adjusting the orientation of the pivotable holders 31. It can e.g. be used for conveying baggage, e.g. in a baggage reclaim area, or palettes in an automated warehouse.

While there are shown and described presently preferred embodiments of the invention, it is to be distinctly understood that the invention is not limited thereto but may be otherwise variously embodied and practiced within the scope of the following claims.

What is claimed is:

1. A floor to be walked upon by pedestrians, the floor comprising:

a two-dimensional array of cells, each cell comprising a weight sensor for detecting the presence of a pedestrian thereon and each cell comprising at least one signal emitter for providing feedback to the pedestrian; and a control responsive to the detectors for driving the emitters.

2. The floor of claim 1 where in the cells are joined to form a hexagonal pattern.

3. The floor of claim 1 wherein the cells are substantially hexagonal.

4. The floor of claim 1 wherein each cell comprises a plurality of light sources of different colors.

5. The floor of claim 1 wherein the emitters emit light.

6. The floor of claim 1 wherein the emitters emit sound.

* * * * *